United States Patent [19]

Grasso

[11] Patent Number: 4,855,192
[45] Date of Patent: Aug. 8, 1989

[54] FUEL CELL CLEAN WASTE WATER DISCHARGE SYSTEM

[75] Inventor: Albert P. Grasso, Vernon, Conn.

[73] Assignee: International Fuel Cells Corporation, South Windsor, Conn.

[21] Appl. No.: 216,489

[22] Filed: Jul. 8, 1988

[51] Int. Cl.$^4$ .................... H01M 8/00; H01M 2/00
[52] U.S. Cl. ......................... 429/13; 429/26; 429/34
[58] Field of Search .............................. 429/13, 26, 34

[56] References Cited

U.S. PATENT DOCUMENTS

| | | | |
|---|---|---|---|
| 4,120,787 | 10/1978 | Yargeau | 429/17 X |
| 4,344,849 | 8/1982 | Grasso et al. | 429/17 X |
| 4,670,357 | 6/1987 | Taylor | 429/26 X |

*Primary Examiner*—Stephen J. Kalafut
*Attorney, Agent, or Firm*—William W. Jones; Edward L. Kochey, Jr.

[57] ABSTRACT

Excess or waste water produced by the operation of a fuel cell power plant is discharged directly into the ambient environment by a discharge system which ensures that only the cleanest water in the system can be discharged. The discharge system is controlled by the amount of water in the power plant water storage tank. The storage tank receives contaminated water from the power plant, and also receives clean water from demineralizing beds. When the quantity of water in the storage tank exceeds a predetermined amount, the clean incoming water from the demineralizing beds is diverted into a drain passage where it is drained from the power plant. The drainage of clean water stops when the amount of water in the storage tank drops below the predetermined amount.

7 Claims, 2 Drawing Sheets

FUEL CELL CLEAN WASTE WATER DISCHARGE SYSTEM

TECHNICAL FIELD

This invention relates to a fuel cell power plant, and more particularly to a water discharge system for such a power plant.

BACKGROUND ART

The electrochemical reaction which occurs in a fuel cell power plant produces water as a by-product. Water is also used as a coolant in the power plant to control cell temperature, since the reaction is an exothermic reaction. Water in the form of steam is also used in the operation of the power plant in the reforming of raw hydrocarbon fuel to hydrogen rich fuel suitable for consumption in the cells. Since water is produced by the plant and is also used to operate the plant, fuel cell power plants will include water circulation systems wherein water will be retrieved, stored, cleaned, and recirculated through the coolant system of the plant. Some water in the form of steam will be comsumed by the power plant in the fuel reforming process, however, it is generally the case that more water will be created in the plant by the electrochemical reaction than will be comsumed by the plant in the form of steam.

In view of the aforesaid, there is a need to periodically drain the water circulation and storage system in the fuel cell power plant. Since the water found in the fuel cell system contains contaminants such as ammonia, carbon dioxide, and system corrosion products, and also contains clean water which has been processed through filters and demineralizing beds, care must be taken to ensure that the water discharged from the plant is clean, and not contaminated. Environmental protection requires that water discharged to the environment have very low levels of contaminants. Thus it is desirable to have a discharge system in the power plant which could discharge only the cleanest water in the system, and one that would operate automatically.

DISCLOSURE OF INVENTION

This invention relates to a water discharge system for a fuel cell power plant which operates automatically and which discharges only the cleanest water from the power plant. The water thus can be discharged directly into ambient surroundings with no possible pollution problems. The system of this invention includes a water storage tank which receives recirculated coolant water, water condensed from steam in the power plant, and water produced by the electrochemical reaction in the power plant. The water in the storage tank is constantly withdrawn therefrom, taken through filters and demineralizing beds and returned to the coolant system. Demineralized water not needed in the coolant system is returned to the storage tank. Excess water building up in the system will reside in the storage tank so that the level of the water in the storage tank will be indicative of the amount of water in the entire system. This invention utilizes a sensor which senses when the water level in the storage tank is at or above a predetermined level, which is selected to represent the presence of excess water in the system. When the predetermined water level is sensed in the storage tank, the flow of incoming clean water from the demineralizing beds is diverted to a drain passage through which it flows out of the system. The incoming flow of contaminated water from the power plant is not disturbed, and contaminated water in the storage tank is prevented from reaching the drain passage. Thus only clean water can be drained from the system.

It is therefore an object of this invention to provide a fuel cell power plant having provisions for direct discharge of excess water to the ambient surroundings.

It is a further object of this invention to provide a power plant of the character described wherein only the cleanest water in the plant can be discharged therefrom.

It is an additional object of this invention to provide a power plant of the character described which operates automatically when the total amount of water in the power plant exceeds a predetermined quantity.

These and other objects and advantages of the invention will become more readily apparent from the following detailed description of a preferred embodiment thereof when taken in conjunction with the accompanying drawings, in which:

BEST MODE FOR CARRYING OUT THE INVENTION

Figure 1:
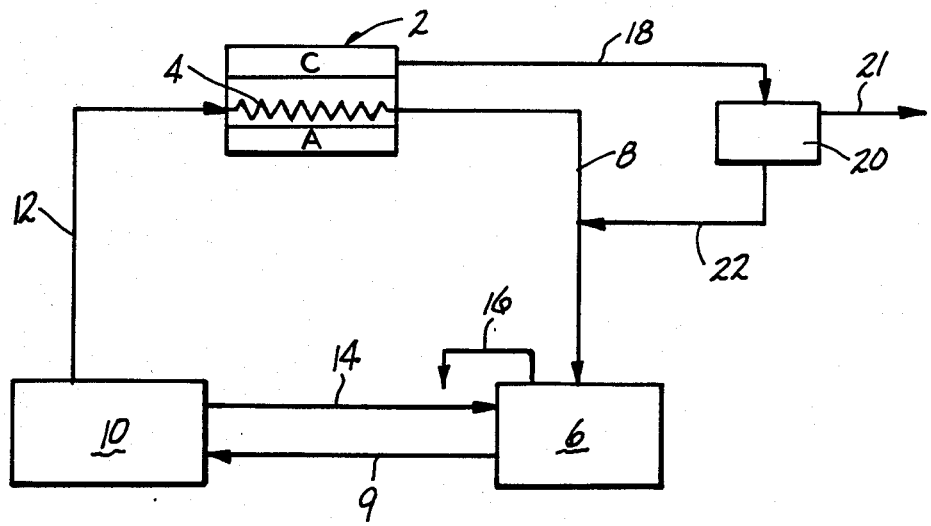
FIG. 1 is a schematic representation of the water circulation system in the fuel cell power plant.

Referring to FIG. 1, the appropriate portion of the power plant is shown schematically. The plant includes a power section 2 which contains the fuel cells and wherein the electrochemical reaction takes place. The power section 2 has a cooling system 4 therein through which a water coolant is circulated to control the temperature of the cells. The water storage tank 6 receives water from the cooling system 4 through line 8 which water will be contaminated with carbon dioxide, ammonia, system corrosion products. The water in the storage tank 6 is continuously withdrawn from the storage tank 6 and taken through line 9 to filter and demineralizing beds 10 wherein the water is decontaminated. Clean water is taken from the demineralizing beds 10 through line 12 back to the cooling system 4 in the power section 2, and excess clean water is recirculated back to the storage tank 6 through line 14. The drain from the storage tank 6 is denoted generally by the numeral 16. In addition to receiving water from the cooling system 4, the storage tank 6 also receives water which is condensed from the exhaust gases from the cathodes C in the power section 2. The cathode exhaust gases carry water vapor which forms from the product water created by the electrochemical reaction. The moist cathode exhaust is taken to a condenser 20 via line 18 wherein the water is condensed out of the cathode exhaust. The condensed water is taken from the condenser 20 to the line 8 through line 22, to be deposited in the storage tank. The dehumidified cathode exhaust leaves the condenser 20 through line 21. In the event that the exhaust gas from the anodes A is sufficiently moisturized by product water, the anode exhaust can likewise be dehumidified and the water therefrom deposited in the storage tank 6. It is thus apparent that clean water is constantly being recirculated into the storage tank 6 through the line 14, and contaminated water is also constantly entering the storage tank 6 through the line 8.

Figures 2, 3:
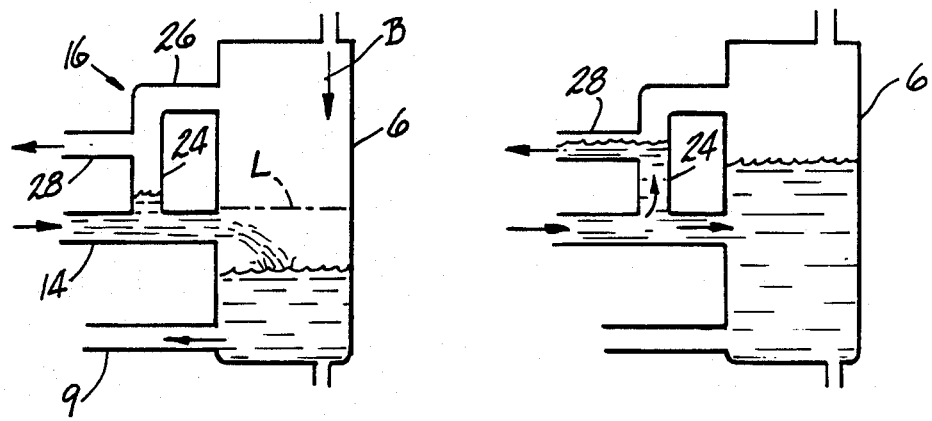
FIG. 2 is a side sectional view of one embodiment of a water draining assembly formed in accordance with this invention shown in a state where no water is being drained from the power plant.
FIG. 3 is a view similar to FIG. 2 but showing how water drains from the power plant at appropriate times.

Referring to FIGS. 2 and 3, a preferred embodiment of an automatic drain control which drains only clean water from the system is shown. The clean water return line 14 is provided with a stand pipe which opens into the line 14, and which also opens into the storage tank 6 via line 26. When the water level in the storage tank 6 is below the return line 14, the clean water will flow from the line 14 into the storage tank 6, as shown in FIG. 2. The contaminated water from the power section flows into the tank 6 from the direction of the arrow B. When the water in the tank 6 reaches the level L (shown as a phantom line) which is above the clean water line port, the clean water flow into the tank 6 will diminish. As the water level rises in the tank 6, the clean water will rise therewith in the stand pipe 24. A drain pipe 28 opens out of the stand pipe above the line 14, and below the line 26. When the water level in the tank 6 and stand pipe 24 rises high enough, as shown in FIG. 3, the clean water in the stand pipe 24 will flow out of the system through the drain pipe 28. Since only clean water can reach the drain pipe 28, there are no environmental problems caused by draining the system directly into ambient surroundings.

Figure 5:
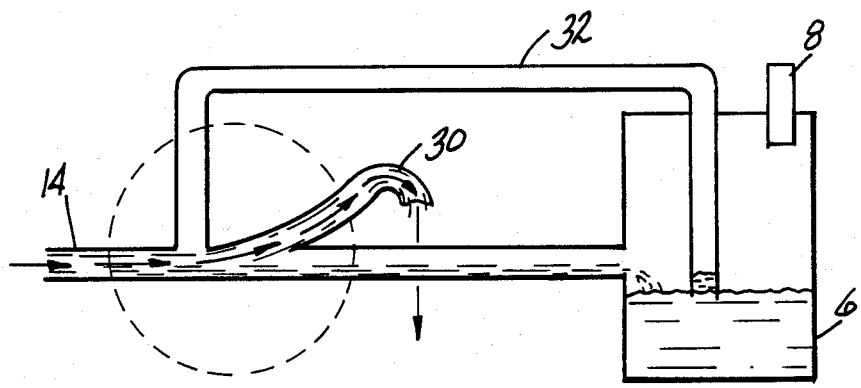
FIG. 5 is a view similar to FIG. 4 but showing how the assembly operates to drain water from the power plant at appropriate times.
Figure 4:
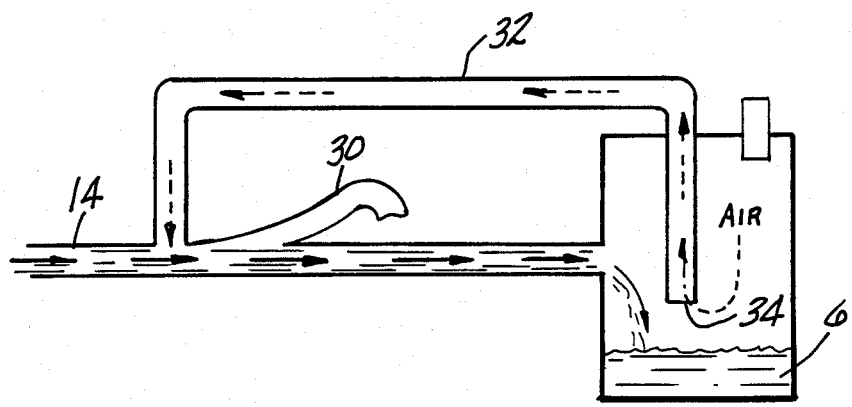
FIG. 4 is a side sectional view of a second embodiment of a drain assembly formed in accordance with this invention shown in a state where no drainage will occur.

Referring now to FIGS. 4 and 5, an alternative embodiment of a drain which allows only clean water to leave the system is shown. In FIG. 4 the water level in the storage tank 6 is below the entry port of the clean water line 14 into the tank 6. The clean water thus flows through the line 14 and empties into the tank 6. The clean water line 14 is provided with a drain branch 30 which gradually diverges away from the line 14. An air pressure tube 32 opens into the clean water line 14 closely adjacent to the drain branch 30 and upstream therefrom in terms of the direction of flow of the clean water. The air pressure tube 32 has an open end 34 which is disposed in the storage tank 6 below the level of the clean water line 14. So long as the water level in the tank 6 remains below the open end 34 of the tube 32, air will be drawn from the tank 6 into the tube 32 as a result of the clean water flow past the end of the tube 32 which opens into the line 14. This will create a positive pressure force in the line 14 upstream of the drain branch 20. When the water level in the tank 6 rises above the end 34 of the tube 32, as shown in FIG. 5, air can no longer flow from the tank 6 through the tube 32. This causes a pressure drop to occur in the clean water line 14 between the opening thereto from the tube 32 and the drain branch 30. When this pressure drop occurs, the clean water flow will follow the wall surface of the line 14 and will flow out through the drain branch 30. The clean water will continue to flow out through the drain branch 30 so long as the end 34 of the tube 32 remains submerged in the water in the tank 6.

It will be readily appreciated that the drain system of this invention operates automatically when needed, and will only drain the cleanest water in the power plant therefrom. Its construction is simple, and its operation is passive. It can be easily retrofitted onto existing fuel cell power plants which have a need for such a feature. The water drained from the power plant can be released directly into ambient surroundings with no further treatment or purification.

Since many changes and variations of the disclosed embodiments of the invention may be made without departing from the inventive concept, it is not intended to limit the invention otherwise than as required by the appended claims.

I claim:

1. A fuel cell power plant having a power section, and having a water circulating system for cooling the power section, said water circulating system comprising:
   (a) a water storage tank for storing water used in said circulating system;
   (b) decontaminating means for cleaning water in said circulating system;
   (c) first means for carrying water from said storage tank to said decontaminating means;
   (d) second means for carrying water from said decontaminating means to said power section for cooling the latter;
   (e) third means for carrying only clean water from said decontaminating means to said storage tank;
   (f) fourth means for carrying contaminated water from said power section to said storage tank; and
   (g) discharge means for releasing water to ambient surroundings from said third means when the amount of water in said storage tank exceeds a predetermined volume whereby only clean water is discharged into the ambient surroundings from the power plant.

2. The fuel cell power plant of claim 1 wherein said fourth means comprises conduit means for carrying contaminated cooling water from said power section to said storage tank, and for carrying product water condensed from cathode exhaust to said storage tank whereby product water will be continuously added to the cooling water in the storage tank.

3. A fuel cell power plant having a power section, and having a water circulating system for cooling the power section, said water circulating system comprising:
   (a) a water storage tank for storing water used in said circulating system;
   (b) decontaminating means for cleaning water in said circulating system;
   (c) first means for carrying water from said storage tank to said decontaminating means;
   (d) second means for carrying water from said decontaminating means to said power section for cooling the latter;
   (e) third means for carrying clean water from said decontaminating means to said storage tank;
   (f) fourth means for carrying contaminated water from said power section to said storage tank; and
   (g) a discharge pipe opening into said third means adjacent to said storage tank, and means associated with said storage tank and operably connected to said discharge pipe for causing water to flow from said third means through said discharge pipe when the level of water in said storage exceeds a predetermined height.

4. The fuel cell power plant of claim 3 further comprising a stand pipe opening into said third means and said discharge pipe, said stand pipe being operable to duct water from said third means to said discharge pipe when the water level in said storage tank rises above an entry port into said storage tank from said third means.

5. The fuel cell power plant of claim 1 wherein said discharge means comprises a discharge pipe opening into said third means upstream in the direction of flow of water from said storage tank; and means responsive to detected increases in the water level in said storage tank operable to create a pressure drop in said third means in the vicinity of said discharge pipe causing water to selectively flow from said third means into said discharge pipe.

6. A method for discharging excess water from a water cooling loop in a fuel cell power plant into ambient surroundings, said method comprising the steps of:
(a) providing a fuel cell power section having an anode side, a cathode side, and a cooling section which uses water as a coolant;
(b) providing a water storage tank for storing water used in the cooling loop;
(c) providing water decontamination means operable to remove decontaminants from water in the cooling loop;
(d) transferring a stream of contaminated water from an outlet side of said power section cooling section to said storage tank;
(e) transferring a stream of water from said storage tank to said decontamination means;
(f) transferring a stream of decontaminated water from said decontamination means to an inlet side of said cooling section while concurrently transferring a stream of excess decontaminated water back to said storage tank;
(g) sensing the amount of water in said storage tank; and
(h) periodically, when the amount of water in said storage tank exceeds a predetermined amount, diverting the stream of excess decontaminated water from said storage tank into a discharge pipe to discharge said stream of excess decontaminated water into the ambient surroundings.

7. The method of claim 6 further comprising the steps of condensing product water out of cathode exhaust gases and transferring a stream of the condensed product water to said storage tank.

* * * * *